United States Patent [19]
Laun

[11] Patent Number: 6,087,279
[45] Date of Patent: Jul. 11, 2000

[54] TEXTILE MATERIAL FOR CLEANING APPLICATIONS

[75] Inventor: Heinrich Hans Laun, Augsburg, Germany

[73] Assignee: Firma Carl Freudenberg, Weinheim, Germany

[21] Appl. No.: 09/042,192

[22] Filed: Mar. 12, 1998

[30] Foreign Application Priority Data

Mar. 12, 1997 [DE] Germany ............ 197 10 032

[51] Int. Cl.$^7$ .................. A47L 13/16; D04H 1/36
[52] U.S. Cl. ........... 442/402; 442/383; 442/403; 442/407; 15/208; 15/209.1; 15/244.1
[58] Field of Search ................ 442/402, 403, 442/407, 383, 381, 388, 392, 401; 15/208, 209.1, 244.1

[56] References Cited

U.S. PATENT DOCUMENTS

| | | | |
|---|---|---|---|
| 4,645,699 | 2/1987 | Neveu | 442/403 X |
| 4,675,226 | 6/1987 | Ott | 442/383 X |
| 4,993,099 | 2/1991 | Emura et al. | 442/402 X |

FOREIGN PATENT DOCUMENTS

WO 90/14039  11/1990  WIPO.
WO 94/23634  10/1994  WIPO.

*Primary Examiner*—Daniel Zirker
*Attorney, Agent, or Firm*—Kenyon & Kenyon

[57] ABSTRACT

A textile surface-area material used for cleaning, having a non-woven material and structures raised over the non-woven material. The structures are on both sides of the surface-area material. The structures can be full-surface or partial surfaces, and the base non-woven material can have structures, staggered on both sides, formed by structure needling. Spacings can be maintained between the structures which corresponds at least to a dimension of the structure on the opposite side. The non-woven can have at least two layers, laminated together, of a non-woven material provided on one side with structures.

65 Claims, 2 Drawing Sheets

TEXTILE MATERIAL FOR CLEANING APPLICATIONS

BACKGROUND OF THE INVENTION

1. Field of the Invention

The present invention relates to a textile surface-area material used for cleaning, the material having a non-woven material and structures raised over the non-woven material. Such a surface-area material may be used as a reusable wiping cloth for the damp and dry cleaning of surfaces.

2. Description of the Prior Art

PCT Publication WO 90/14039 discloses a textile surface-area material made of a non-woven material composed of non-woven fibers, out of which a plurality of thread loops or fiber ends protrude as the result of needling, which loops form cohesive surface areas.

PCT Publication WO 94/23634 shows a wiping cover which is made of a textile frame that accommodates two different kinds of cleaning materials. That publication concerns a wiping cover, assembled from several components, with different wiping properties on either side.

SUMMARY OF THE INVENTION

The object of the present invention is to develop a surface-area material used for cleaning that improves the usability of the surface-area material in a simple manner.

Because structures are on both sides of the surface-area material of the present invention, the structures exist as full or partial surfaces. Therefore the textile surface-area material is usable in the same way on both sides, so that when using the surface-area material, one does not have to be careful which side is used. A full surface, as used herein, is, for example, a raised or pile fabric, which may be woven or knitted with a napped surface on both sides; partial surfaces as used herein, relate only to certain areas of the surface.

If the structure of the base non-woven material is made using structural needle felting in a manner so that the structures are simultaneously misaligned—spacings being preserved between the patterns on the opposite side—then products having relatively low mass per unit area can be produced in a simple manner. In so doing, the lateral spacings between the structures on opposite sides must be sufficient to avoid an overlap of the structuring of the two sides. The structures introduced on both sides can also be of the same kind, or even identical.

Given sufficient spacing, the structures of the one non-woven material can be fitted into the unstructured interspaces or interstices of the counter or opposite non-woven material, or lamination may be used in such a way that the structures of both non-woven materials overlap. In both cases, a functional reinforcement can be attained during use—e.g. by a long-handled scrubber. Thus, by intensified pressure of the unstructured interspaces or interstices on the floor, the drying performance can be increased, or by the intensified pressure of the congruent structures of both non-woven materials, the cleaning performance can be improved. However, laminated products have a higher mass per unit area.

In a further embodiment, the textile surface-area material may have at least two non-woven materials laminated to one another, each non-woven material being provided on one side with structurings. At the same time, at least one of the non-woven materials can be reinforced with a support material.

Support materials can be used to reinforce the products, to improve their resistance to tearing, and to improve shape stability during use and during washing. These support materials can be arranged between the non-woven materials, or as overlay on a non-woven material and/or in the laminate when laminating two structured non-woven materials.

Possible materials which may be used as support materials are spun-bonded materials or other materials such as interlaid scrim, woven fabric and knit fabric, the latter preferably having a high synthetic-fiber component (at least 50%), or else even being made completely of synthetic fibers, preferably polyester (PES).

For reinforcement and to improve the resistance to tearing, a spun-bonded material or other materials for reinforcement such as interlaid scrim, woven fabric, knit fabrics of synthetic fibers, preferably of polyester (PES) having a mass per unit area of 20 to 60 $g/m^2$, is incorporated between the layers or as overlay. This also improves the shape stability during use and washing.

Preferably, the base non-woven materials are needle-punched non-woven materials which can be heat-set and which can also be reinforced by a support material that is needle-punched and/or thermo-bonded to a non-woven material. Alternatively, a support material can be introduced when laminating two base non-woven materials. The laminating can likewise be carried out by thermobonding, e.g., using fusible fabrics, or by applying an adhesive. The choice of adhesive determines the suitable aftertreatments.

Possible materials for use as support material may be spun-bonded material or interlaid scrim, or a woven fabric or knit fabrics having a synthetic-fiber component of at least 50%, PES polyester preferably being used as the synthetic fiber, and the support material having a mass per unit area of 20 $g/m^2$ to 60 $g/m^2$.

If the non-woven material is composed of two layers of different fiber types and fiber properties, the two sides can be used for different purposes, for example, one side for cleaning, and the other side for drying. To ensure the user works with the correct structured areas, a different fiber color can also be used.

If a base non-woven material is homogenous, i.e., is produced from a preferably fine-denier fiber blend, then, given structure needling that is of the same kind or identical on both sides, products are obtained which are usable in the same way on both sides. This is also true if the base non-woven material is made of two layers differing in color, insofar as the formulations of the two fiber blends and the definitions of the individual components, with the exception of color, do not differ. In this case, the different color only emphasizes the effect of the structure.

If the base non-woven material, structured on both sides, is composed of two layers having different fiber formulations and/or different definitions of the individual components, the two sides can preferably be used for different purposes, for example, one side for cleaning and the other side for drying. This effect can be strengthened by a different structuring on both sides. In that case, the two colors also designate the two applications for the sides.

In the case of products which are preferably homogeneously composed and are to be used in the same way on both sides, the drying and cleaning performance can be optimized by the type of structure and the ratio of structured surface to unstructured surfaces. Thus, it is possible to attain products which offer the same good cleaning and drying effect on each side. This is also true for products constructed of two structured, individual non-woven materials which are laminated.

In order to attain a structure, i.e., to bring fibers from the horizontal position into the vertical position, a certain fiber padding is necessary. Usable structures can already be attained at a fiber weight of 100 g/m²; preferably, the surface-area material has a mass per unit area of 150–300 g/m².

A range advantageous for cleaning effectiveness is specified by a non-woven material made of a fine layer and a coarse layer, where the coarse layer represents 30 to 50% of the total weight and is made of 50 to 100% synthetic fibers, preferably polyester (PES) having a titer of 4.2 to 17 dTex. Using a coarse fiber influences the cleaning effect, since the scrubbing efficiency rises.

By adding a fusible fiber, preferably of modified polypropylene (PP), making up 15 to 100% of the synthetic-fiber content, a bonding is formed between the other fibers, in addition to the needle punching, by activating the fusible fibers with the assistance of temperature.

In addition to the bonding by fusible fibers, the non-woven material may be bonded primarily by needle-punching with the assistance of felting needles. Work is done with 80 to 200 punctures/cm², preferably with 120 to 150 punctures/cm².

Depending on the application, continuous or interrupted lengthwise stripes, as well as interrupted and/or staggered horizontal stripes or other interrupted or cohesive patterns such as letters of the alphabet can be produced by structure needling, resulting in special cleaning effects.

If the coarse non-woven material is needled through the fine non-woven material during the structuring, a special effect results: locally bounded scrubbing zones.

Given a puncture depth between 5 and 25 mm, preferably between 5 and 15 mm, by fork needles or crown needles, pronounced structures are obtained during the structuring process without having to accept a substantial loss in tensile strength of the textile material.

By fusing the fusible fibers after producing the structured non-woven material, binding points are created between the remaining fibers after cooling down. A further bonding of the non-woven material is achieved, in addition to the needle punching.

Advantageously, at least 80% of the synthetic fibers in the coarse-fiber layer have a titer of 4.2 to 6.8 dTex, not more than 20% coarser fibers being admixed.

The portion of at least 40% absorbing fibers, preferably viscose rayon and/or cotton, in at least one layer of the non-woven material may be of special importance for the start of the water-absorption process, the remaining fine-denier fibers forming a fine-pored non-woven material and, by high capillary effect, making possible a high absorption with good water retention.

Preferably viscose rayon in a fine denier range of 1.3 dTex to 2.2 dTex and/or cotton are used as absorbing fibers.

It is also possible to achieve a surface structure by yarns or twisted threads in loop form or open loops which are introduced into a base material over the entire surface or in partial areas. Such products are on the market for cleaning purposes, provision preferably being made for use on one side. Woven fabric or knit fabrics, preferably of synthetic fibers, are used as base material.

This base material is inactive with regard to water retention. However, if a needle-punched non-woven material is used as base material, preferably homogeneous, reinforced with a stabilizing fabric and already heat-set, then the result is a material active for water retention and with high water absorption, with a very good water retention value and easy elimination of water when squeezing or wringing out. If the structure extends only on partial areas, and if the non-structured area is in contact with the object to be cleaned, then the drying performance is thereby greatly increased compared to products presently used which must clean and dry with the structure of yarns or twisted threads, which nevertheless achieve a very good cleaning. The improved drying performance can be achieved due to the negligible water film remaining and its quicker drying. Thus, a cleaned floor may be walked upon again more quickly.

On the other hand, because the cleaning medium on a non-woven base can be wrung out better, less water need be applied.

If two such materials on a non-woven base are laminated on the back side, in that the structures are mutually fitted, or else overlap, a product is obtained that is usable in the same way on both sides.

Naturally, if necessary, a non-woven material that is structured on one side by yarns or twisted threads can also be laminated on the opposite side to unstructured materials such as other non-woven materials, or to non-woven materials structured by needling.

Products having a one-sided or double-sided yarn or twisted-thread structure on a non-woven material have further advantages compared to such products on a woven-fabric and knit-fabric base. Controlled squeezing or wringing-out permits a controlled uptake of water. This also allows an adjusted liberation of water on the object to be cleaned. In the case of dried-on dirt, one will extract less water at first, thus will use the cleaning medium in a wetter form to loosen the dirt, and subsequently, after strong extraction of water, will carry out a good drying operation with the same medium.

It is not possible to attain favorable squeezing effects, and thus drying effects which are as favorable, in the case of media on a woven-fabric and knit-fabric base, respectively, because of the inactive water retention of the base and the negligible water-extraction capability of the yarns and twisted threads, which are proportionally higher than in the case of material with a non-woven base.

Furthermore, it is possible to use lower structures, and thus less yarn and twisted thread, respectively, because of the fine-porosity. The active base non-woven material absorbs loosened dirt and water much better than the yarns and twisted threads, respectively, which are solely available for this purpose in the case of an inactive base.

In addition, non-woven materials release dirt and water more easily than yarns or twisted threads; this results in a higher squeezing effect. Finally, because of the better squeezing stability and resistance to tearing, products on a non-woven base having lower structure height adhere less to the floor than products having an inactive base and higher structures, and thus require less physical effort to use, which is particularly important for commercial users.

The yarns or twisted threads can be introduced, using the tufting process or the malipol process, into the non-woven base in loop form either over the entire surface or in lengthwise stripes, which do not have to be straight—for example, they may zigzag. These loops can be opened with a velouring or napping device.

The individual components are preferably in the titer range between 1.7 dTex and 10 dTex. The portion of absorbing fibers should not fall below 40%.

The loop height can be between 3 and 12 mm, preferably at 5 to 7 mm.

The yarns and twisted threads, respectively, lie preferably in the rough range of Nm1 (2xNm2) to Nm12 (2xNm24), mainly in the range Nm5 (2xNm10) to Nm8 (2xNm16). Advantageously, the yarns and twisted threads, respectively, are made of viscose rayon fibers and synthetic fibers, preferably polyester (PES), it being possible for up to 50% of the synthetic fibers to be fusible fibers.

Preferably, in the case of twisted threads or yarns made of at least 40% absorbing fibers, apart from the absorbing fibers, synthetic fibers, preferably PES, are used, fusible fibers, preferably of PP, also being provided in the range of 15% to 100% of the synthetic fibers.

The yarn loops and twisted-thread loops, respectively, are introduced by the tufting or malipol process.

In the case of tufting, preferably a needle spacing is selected between 1.4 and 2 mm. In the case of a partial-area structuring, only the necessary needles are loaded. The number of stitches per running cm lies approximately between 25 and 42.

The tufted material is coated, preferably by an acrylate, to bond the loops in the material back. If two structured non-wovens are laminated, the back coating can be omitted.

The fusible fibers in the yarn are activated when drying and curing the back coating. This gives additional strength to the yarn and twisted threads, respectively. The somewhat increasing stiffening promotes the scrubbing quality. If the back is not coated, the fusible fibers must be activated during an extra procedure.

BRIEF DESCRIPTION OF THE DRAWING

The drawings show exemplary embodiments of the invention, wherein:

FIG. 6b is a non-woven material having a double-sided, striped velour, produced from the full-surface velour of FIG. 6a;

DETAILED DESCRIPTION OF THE INVENTION

Figure 1:
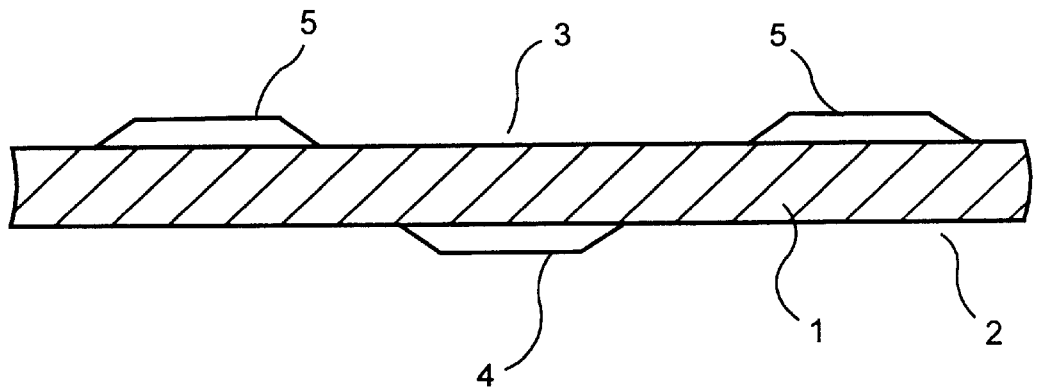
FIG. 1 is a section through a textile surface-area material having structures in the form of partial areas staggered relative to each other.

FIG. 1 shows a non-woven material 1 having raised structures 4, 5 on its two sides 2, 3. Structures 4, 5 are formed as partial areas and do not mutually overlap. However, a safety spacing can also be used which is preselected to be greater by 10 mm than the size of the structures on the opposite side. The structures 4, 5 are produced by structure needling from both sides, it being possible for the needle penetration to vary between 5 and 15 millimeters. Non-woven material 1 can be made of a needle-punched non-woven material which can be heat-set.

Figure 2:
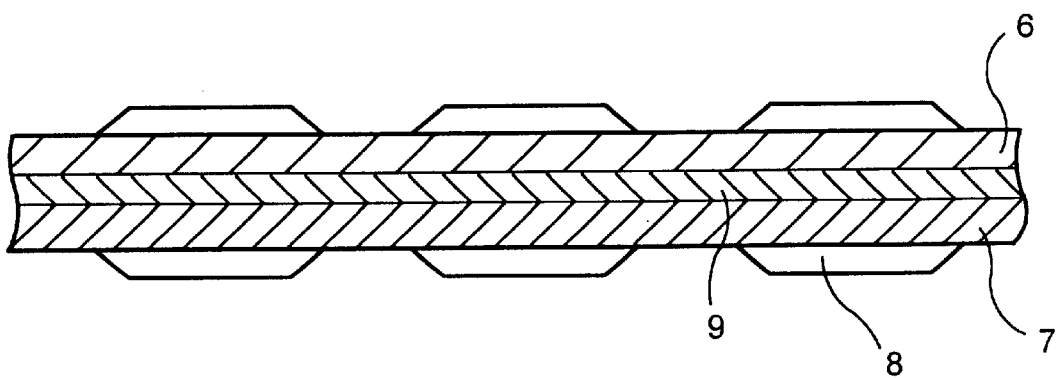
FIG. 2 is a textile surface-area material made of two laminated non-wovens.

Shown in FIG. 2 is a surface-area material made of two non-woven materials 6, 7, between which a support material 9 is arranged. Each of non-woven materials 6, 7 is provided with structures 8 which, independently of one another, are also arranged mutually opposing each other.

Figure 3:
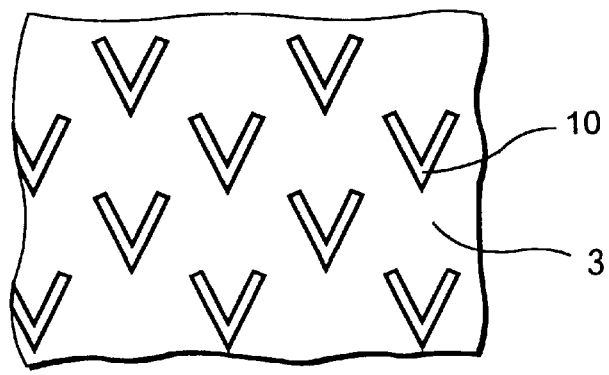
FIG. 3 is a textile surface-area material having structures in the form of an alphabet-letter pattern.

Shown in FIG. 3, as an example of another embodiment, is a structure in the form of alphabet letters 10 which stand out with respect to surface 3.

Figure 4:
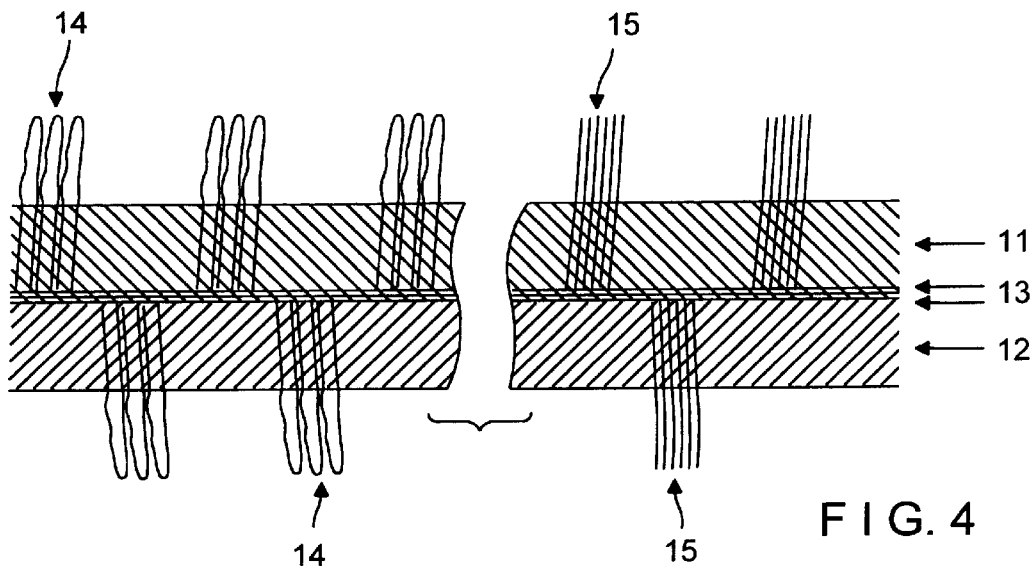
FIG. 4 is a section through a surface-area material made of two laminated non-woven materials, each of which is reinforced by a support material resting on it.

Shown in section in FIG. 4 is a surface-area material laminated from two non-woven materials 11, 12, both non-woven materials 11, 12 being reinforced by a support material 13 which is needled and/or fixed on to the non-woven materials 11, 12. Each non-woven material 11, 12 is provided with structures—specifically yarn loops 14 or open yarn loops 15, respectively.

If a textile surface-area material, composed of a homogenous non-woven material and a non-woven material made of two or more layers having different fiber blends, is to be provided on both sides with a structure, only the staggered structuring shown in FIG. 1 can be produced by structure-needling the surface-area material.

On the other hand, if two non-woven materials, separately structured on one side, are laminated together, then the structures can lie opposite each other, as shown in FIG. 2. This would also be possible with a product according to FIG. 4.

The most variable visual and functional effects can be created in this manner.

Figure 5:
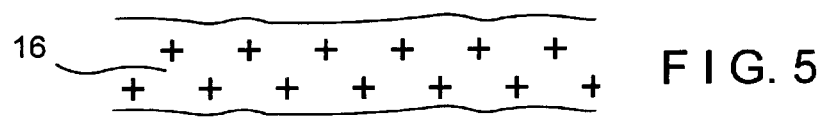
FIG. 5 shows a non-structured, non-woven material as starting material.
Figure 6A:
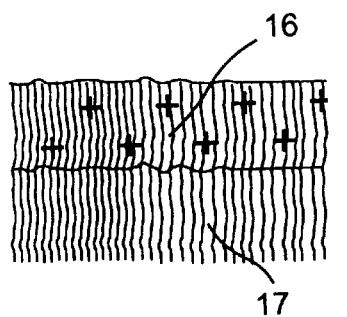
FIG. 6a is a full-surface, one-sided velour produced from the non-woven material shown in FIG. 5.

Shown in FIGS. 5 to 7 is the manufacture of a surface-area material, structured on both sides, starting from an unstructured non-woven material 16. In FIG. 6a, starting from non-woven material 16, a one-sided, full-surface velour 17 is produced by a fully loaded needle board. After the first passage through the processing machine, the material thus produced is turned over, so that full-surface velour 17 is on top. The velour is then back-needled in stripe form on the opposite side by a needle board which is set with needles, in stripes, in the direction of production. Stripes 18, shown in FIG. 6, are formed by this back-needling.

Figure 7A:
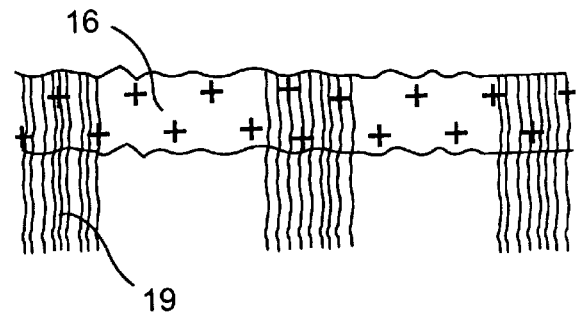
FIG. 7a is a non-woven material having velour in the form of stripes.

In FIG. 7a, starting from non-structured, non-woven material 16, a velour is produced in stripe form by a needle board which is set with needles, in stripes, in the direction of production. Thus, in contrast to FIG. 6a, there is no full-surface velour, but already a velour in striped form, a spacing being maintained between stripes 19, permitting the introduction of another stripe.

The material thus obtained is again turned over after the first passage through the processing machine. The introduction of the velour on the opposite side, centrally between two velour stripes 19 attained during the first passage, is effected by the same board with phase-displaced infeed of the material, or by a board that is set with needles, phase-displaced, in stripes. In both cases, an exact control of the material is necessary to prevent lateral deviations. Preferably, a minimal lateral clearance of 3 mm is necessary between opposite velour stripes 19, 20 to avoid over-needling.

Figure 6B:
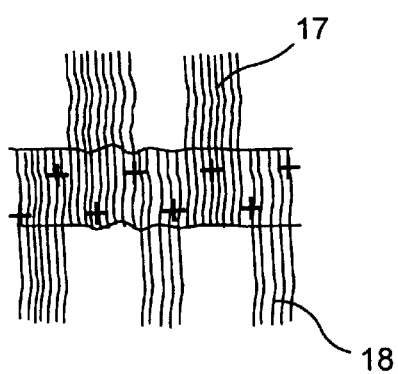

In the case of the surface-area material according to FIG. 6b, the structures of both sides are contiguous to one another without intervening spaces. Thus, the sum of the structured areas of both sides corresponds to the starting area of the one-sided, full-surface velour. According to the pattern, the structure areas can be selectively, proportionally distributed between both sides. It is likewise possible to back-needle other structures from the velour side onto the opposite side, and specifically as velour with a Di-Lour structure-needling machine, or in loop form with the Di-Loop structure-needling machine.

Figure 7B:
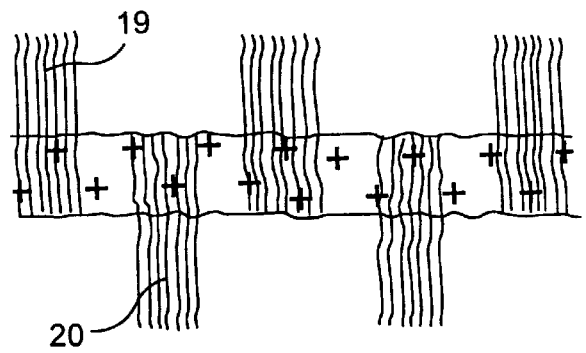
FIG. 7b is a non-woven material having a double-sided velour in the form of stripes, the stripes being set apart.

The surface-area material according to FIG. 7b can have stripes of variable width, but starting from FIG. 7a, it is also possible to introduce a structure on the opposite side, between velour stripes 19, as shown in FIGS. 1 to 3, and specifically as velour or in loop form. In the case of this surface-area material, the entire area, structured on both sides, is always smaller than the area of one material side, because it is necessary to include a lateral safety clearance between the patterns on the opposite sides, in order to avoid an over-needling. This method makes it possible to vary to a great extent the portion of structures on the entire surface and per side by the selection of the patterns and the size of the spacing between the mutually running pattern sections.

In the above description of the invention, those skilled in the art will perceive improvements, changes and modifications. Improvements, changes and modifications within the skill of the art are intended to be covered by the claims.

What is claimed is:

1. A textile surface-area material for cleaning purposes, comprising:
   a non-woven material having two sides and projecting areas raised above the non-woven material, the projecting areas being located on both sides of the non-woven material, the projecting areas covering at least a partial area of both of the sides; and
   a support material reinforcing the non-woven material.

2. The textile surface-area material of claim 1, wherein:
   the projecting areas are staggered on the two sides, and wherein the projecting areas are formed by structure needling, and wherein a lateral spacing between the projecting areas on one side is at least as large as a lateral dimension of the projecting areas on an opposite side.

3. The textile surface-area material of claim 1, wherein:
   a lateral spacing between projecting areas on one side is larger than the lateral dimensions of the protecting areas on the opposite side by at least 3 mm.

4. A textile surface-area material for cleaning purposes, comprising:
   a non-woven material including two non-woven materials laminated together, the non-woven material having two sides and projecting areas raised above the non-woven material, the projecting areas being located on both sides of the non-woven material, the projecting areas covering at least a partial area of both of the sides; and
   a support material, at least one of the non-woven materials being reinforced by the support material.

5. The textile surface-area material of claim 1, wherein:
   the support material is laminated to the non-woven material.

6. The textile surface-area material of claim 1, wherein:
   the support material is a spun-bonded material.

7. The textile surface-area material of claim 1, wherein:
   the support material is an interlaid scrim.

8. The textile surface-area material of claim 1, wherein:
   the support material has a synthetic-fiber component of at least 50%.

9. The textile surface-area material of claim 8, wherein:
   the synthetic fiber component is polyester.

10. The textile surface-area material of claim 1, wherein:
    the support material has a mass per unit area of 20 g/m$^2$ to 60 g/m$^2$.

11. The textile surface-area material of claim 1, wherein:
    the non-woven material includes at least two layers of non-woven materials, each layer formed of fibers having different fiber properties than the other layer.

12. The textile surface-area material of claim 1, wherein:
    the textile surface-area material has a mass per unit area of more than 100 g/m$^2$.

13. The textile surface-area material of claim 12, wherein:
    the textile surface-area material has a mass per unit area of 150 g/m$^2$ to 300 g/m$^2$.

14. The textile surface-area material of claim 1, wherein:
    the non-woven material includes at least one layer, the at least one layer of the non-woven material including at least 40% absorbing fibers.

15. The textile surface-area material of claim 14, wherein:
    the at least one layer of the non-woven material includes viscose rayon in a fine-denier range of 1.3 dTex to 2.2 dTex.

16. The textile surface-area material of claim 15, wherein:
    the at least one layer of the non-woven material is made of cotton.

17. The textile surface-area material of claim 1, wherein:
    the non-woven material includes a fine layer and a coarse layer, and wherein the coarse layer represents 30 to 50% of a total weight of the non-woven material.

18. The textile surface-area material of claim 17, wherein:
    the coarse layer includes 50 to 100% synthetic fibers.

19. The textile surface-area material of claim 18, wherein:
    the synthetic fibers are polyester.

20. The textile surface-area material of claim 18, wherein:
    the synthetic fibers have a titer of 4.2 to 17 dTex.

21. The textile surface-area material of claim 1, wherein:
    the non-woven material includes two non-woven materials which are both homogeneously composed.

22. A textile surface-area material for cleaning purposes, comprising:
    a non-woven material having two sides and projecting areas raised above the non-woven material, the projecting areas being located on both sides of the non-woven material, the projecting areas covering at least a partial area of both of the sides, and
    wherein the non-woven material includes two non-woven materials, and wherein both non-woven materials are double-ply with different fiber blends.

23. The textile surface-area material of claim 1, including:
    synthetic fibers including a fusible fiber which is 15 to 100 percentage by weight of the textile surface-area material.

24. The textile surface-area material of claim 23, wherein:
    the synthetic fibers are modified polypropylene.

25. The textile surface-area material of claim 1, wherein:
    the non-woven material is needle-punched with approximately 80 to 200 punctures/cm$^2$.

26. The textile surface-area material of claim 25, wherein:
    the non-woven material is needle-punched with approximately 120 to 150 punctures/cm$^2$.

27. The textile surface-area material of claim 1, wherein:
    the projecting areas are horizontal stripes produced by structure needling.

28. The textile surface-area material of claim 1, wherein:
    the projecting areas are alphabet letters produced by structure needling.

29. The textile surface-area material of claim 17, wherein:
    the coarse layer is needled through the fine layer.

30. The textile surface-area material of claim 1:
the projecting areas are formed by varying a penetration depth between 5 and 25 millimeters during structure needling.

31. The textile surface-area material of claim 30:
the projecting areas are formed by varying a penetration depth between 5 and 12 millimeters during structure needling.

32. The textile surface-area material of claim 23, wherein:
the fusible fibers are fused after the projecting areas are produced.

33. The textile surface-area material of claim 17, wherein:
the coarse layer includes synthetic fibers.

34. The textile surface-area material of claim 33, wherein:
at least 80% of the synthetic fibers have a titer of 4.8 to 6.8 dTex.

35. The textile surface-area material of claim 17, wherein:
not more than 20% of the fibers of the coarse layer are admixed.

36. The textile surface-area material of claim 1, wherein:
the structures are made of loops.

37. The textile surface-area material of claim 36, wherein:
the loops are yarn loops.

38. The textile surface-area material of claim 36, wherein:
the loops are twisted-thread loops.

39. The textile surface-area material of claim 38, wherein:
the loops are open loops.

40. The textile surface-area material of claim 1, wherein:
the projecting areas are initially produced on the entire surface of the non-woven material.

41. The textile surface-area material of claim 1, wherein:
the projecting areas are initially produced in stripes.

42. The textile surface-area material of claim 41, wherein:
the stripes are straight-lined.

43. The textile surface-area material of claim 41, wherein:
the stripes zig-zag.

44. The textile surface-area material of claim 1, including:
fibers in the titer range of 1 dTex to 6.8 dTex.

45. The textile surface-area material of claim 1, including:
fibers in the titer range of 1.3 to 2.8 dTex.

46. The textile surface-area material of claim 1, including:
fibers having a fiber content of at least 40% absorbing fibers.

47. The textile surface-area material of claim 46, wherein:
the absorbing fibers are viscose rayon.

48. The textile surface-area material of claim 46, wherein:
the absorbing fibers are cotton.

49. The textile surface-area material of claim 36, wherein:
a height of the loops is 3 mm to 12 mm.

50. The textile surface-area material of claim 49, wherein:
a height of the loops is 3 mm to 7 mm.

51. The textile surface-area material of claim 36, wherein:
the loops are coarse in the range of Nm1 (2xNm2) to Nm12 (2xNm24).

52. The textile surface-area material of claim 51, wherein:
the loops are in the range of between Nm5 (2xNm10) and Nm8 (2xNm16).

53. The textile surface-area material of claim 36, wherein:
the loops contain at least 40% absorbing fibers.

54. The textile surface-area material of claim 36, wherein:
the absorbing fibers are viscose rayon.

55. The textile surface-area material of claim 36, wherein:
the absorbing fibers are cotton.

56. The textile surface-area material of claim 36, wherein:
the loops include synthetic fibers.

57. The textile surface-area material of claim 56, wherein:
the synthetic fibers include polyester.

58. The textile surface-area material of claim 56, wherein:
the synthetic fibers include fusible fibers.

59. The textile surface-area material of claim 58, wherein:
the fusible fibers include polypropylene.

60. The textile surface-area material of claim 58, wherein:
the fusible fibers are 15% to 100% of the synthetic fibers.

61. The textile surface-area material of claim 36, wherein:
the loops are created by a tufting process.

62. The textile surface-area material of claim 36, wherein:
the loops are created by a malipol process.

63. The textile surface-area material of claim 36, wherein:
the loops have a stitch count of 25 to 42 stitches per 10 running centimeters.

64. The textile surface-area material of claim 36, wherein:
the non-woven material includes two non-woven materials laminated together.

65. A textile surface-area material for cleaning purposes, comprising:
a non-woven material having two sides and projecting areas raised above the non-woven material, the projecting areas being located on both sides of the non-woven material, the projecting areas covering at least a partial area of both of the sides, the non-woven material including two non-woven materials, and wherein only one of the non-woven materials is homogeneously composed, and wherein the other non-woven material is double-ply.

* * * * *